April 14, 1964 N. T. KEHOE ET AL 3,128,579
APPARATUS AND PROCESS FOR ABRADING TIRE SIDEWALLS
Filed March 1, 1961 9 Sheets-Sheet 1

INVENTORS
NORMAN T. KEHOE
JOE F. SCANTLAND
BY
Charles A. Blank
ATTORNEY

April 14, 1964  N. T. KEHOE ET AL  3,128,579
APPARATUS AND PROCESS FOR ABRADING TIRE SIDEWALLS
Filed March 1, 1961  9 Sheets-Sheet 3

Fig. 3

INVENTORS
NORMAN T. KEHOE
JOE F. SCANTLAND
BY
ATTORNEY.

April 14, 1964 N. T. KEHOE ET AL 3,128,579
APPARATUS AND PROCESS FOR ABRADING TIRE SIDEWALLS
Filed March 1, 1961 9 Sheets-Sheet 4

Fig. 4

INVENTORS
NORMAN T. KEHOE
JOE F. SCANTLAND
BY
Charles A. Blank
ATTORNEY.

April 14, 1964  N. T. KEHOE ET AL  3,128,579
APPARATUS AND PROCESS FOR ABRADING TIRE SIDEWALLS
Filed March 1, 1961  9 Sheets-Sheet 5

INVENTORS
NORMAN T. KEHOE
JOE F. SCANTLAND
BY
Charles A. Blank
ATTORNEY.

April 14, 1964 N. T. KEHOE ET AL 3,128,579
APPARATUS AND PROCESS FOR ABRADING TIRE SIDEWALLS
Filed March 1, 1961 9 Sheets-Sheet 8

Fig. 13

INVENTORS
NORMAN T. KEHOE
JOE F. SCANTLAND
BY
Charles A. Blank
ATTORNEY.

Fig. 15

INVENTORS
NORMAN T. KEHOE
JOE F. SCANTLAND
BY
Charles A. Blank
ATTORNEY.

United States Patent Office 3,128,579
Patented Apr. 14, 1964

3,128,579
APPARATUS AND PROCESS FOR ABRADING
TIRE SIDEWALLS
Norman T. Kehoe, Detroit, and Joe F. Scantland, East
Detroit, Mich., assignors to United States Rubber Company, New York, N.Y., a corporation of New Jersey
Filed Mar. 1, 1961, Ser. No. 92,630
16 Claims. (Cl. 51—106)

This invention relates to a process of and apparatus for abrading the sidewalls of automobile tires, and more particularly to a process of and apparatus for grinding and cleaning white sidewalls.

Heretofore known techniques and apparatus for abrading the sidewalls of tires have in general been subject to several limitations. It has ordinarily been necessary for an operator manually to place each tire on the apparatus, then to position and manipulate the grinding wheel or wheels of the apparatus, and finally to remove the tire after abrasion. Moreover, a plurality of different manually selected positions of the grinding wheels are usually required for operating on tires of different sizes.

Copending application Serial No. 798,148, filed March 9, 1959, now Patent No. 3,001,334, dated September 26, 1961, discloses a fully automatic sidewall grinding apparatus and procedure in which the tires are fed one at a time but in a continuous sequence by automatic conveyor means to and from the automatically operated grinding wheel system of the apparatus. This apparatus, however, abrades a stationary sidewall and is equipped with a rockable grinding wheel for the intended finish grinding operation. The finish grinding wheel is adapted to be rocked about an axis transverse to its axis of rotation during the finish grinding operation so as to follow the stationary contour of the sidewall.

It is, therefore, an object of the present invention to provide a new and improved process of and apparatus for precisely abrading the sidewalls of tires, which are free of the limitations of heretofore known processes and apparatus of this type.

It is also an object of the present invention to provide a new and improved apparatus which is capable of precisely abrading the sidewalls of tires in a wide range of sizes and which automatically effects both the initial positioning of each tire for rough sidewall abrasion and the subsequent adjustment of the position of the sidewall for the finish grinding thereof.

A further object of the present invention is the provision of a tire sidewall grinding process in which the orientation of the sidewall surface being ground relative to the finish grinding wheel is continually changed.

More particularly, in accordance with the present invention, the apparatus for precisely abrading the sidewalls of tires comprises grinding means, a pair of bead-engaging means for gripping and supporting a tire so as to present the sidewall to be abraded to the grinding means, and means for adjusting the relative position of at least one of the pair of bead-engaging means with respect to the other thereof to change the orientation of the sidewall relative to the active surface of the grinding means while the sidewall is being subjected to the action of the grinding means.

For a better understanding of the present invention, together with other and further objects thereof, reference is had to the following description taken in conjunction with the accompanying drawings, in which.

Figures 1, 9:
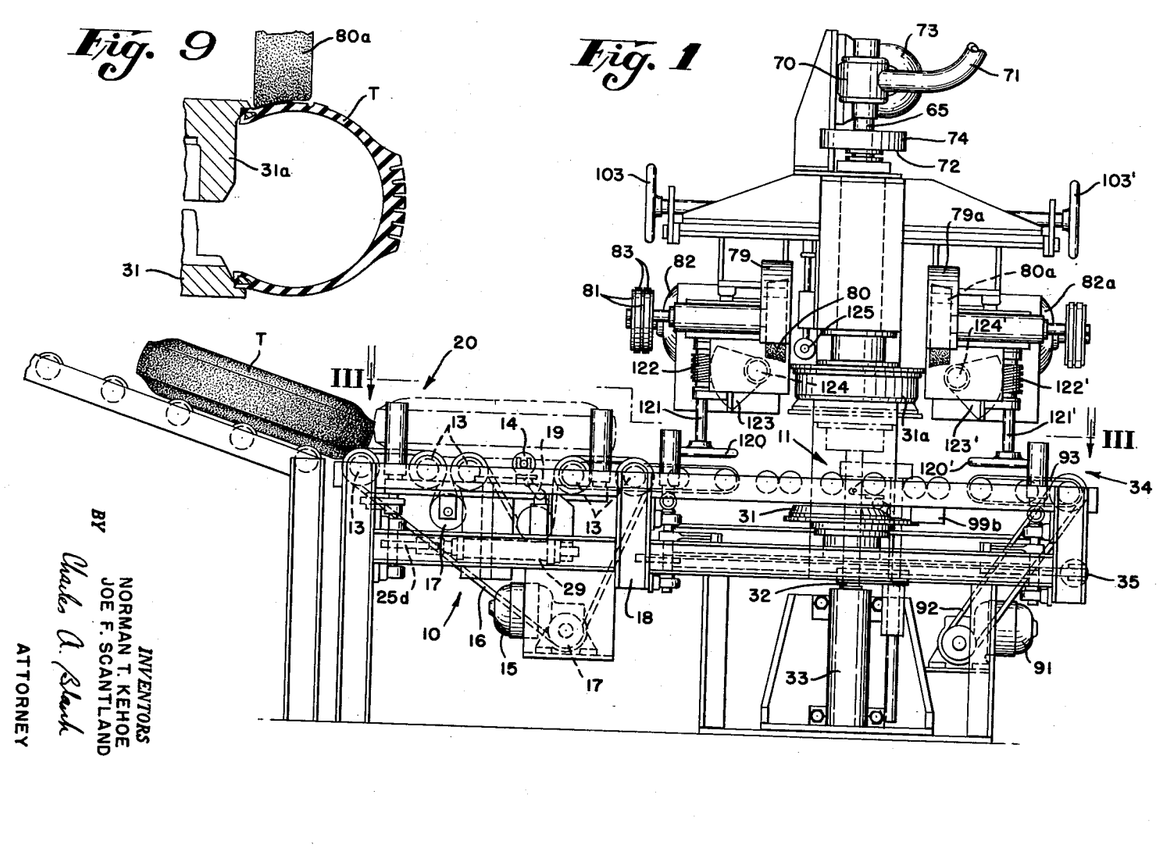
FIG. 1 is a front elevational view of the sidewall abrading apparatus constructed in accordance with the present invention.
FIG. 9 is an enlarged fragmentary illustration of the final operative relation between the finish grinding wheel and the sidewall of the tire being treated.

Referring now more particularly to the drawings, FIG. 1 shows the sidewall abrading apparatus, constructed in accordance with the present invention. Certain electrical circuits and a solenoid control valve and piping system, which will be more fully described hereinafter in connection with FIGS. 14 and 15, have been omitted from FIG. 1 for the sake of clarity. The apparatus shown in FIG. 1 basically comprises an intake or feeder portion 10 and a tire-supporting or drum assembly 11.

The feeder portion 10 comprises a horizontal conveyor system having active rolls 13, 13 driven by a suitable motor 15 through a belt and pulley system 16, 17. A vertically displaceable idler roll 14 is provided for control purposes described hereinafter. A suitable frame 18 supports the motor and conveyor system. A limit switch 19 is mounted for actuation by idler roll 14. The feeder portion 10 of the apparatus also includes means for accepting one tire at a time into the apparatus comprising a mechanism 20 controlled by limit switch 19.

Figure 2:
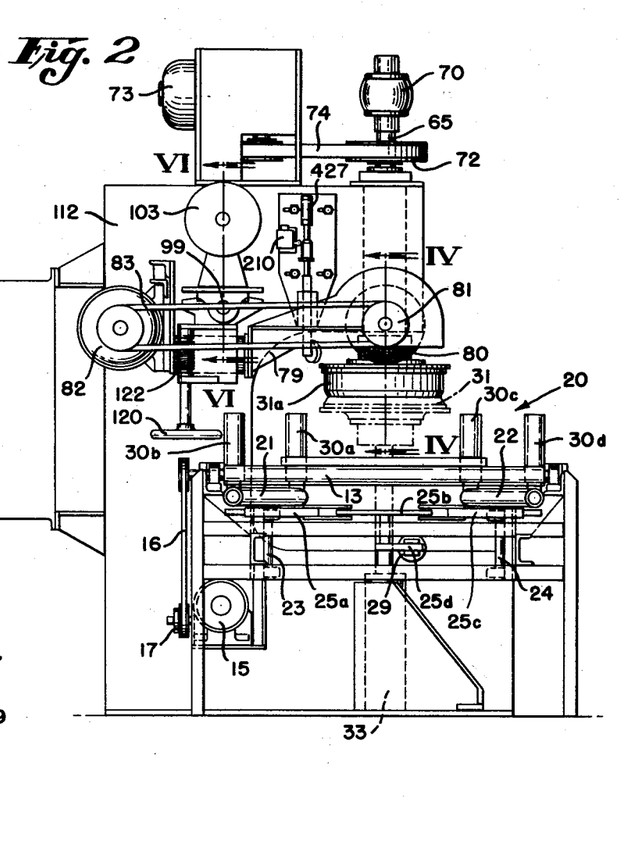
FIG. 2 is a side elevational view of the apparatus shown in FIG. 1.
Figure 3:
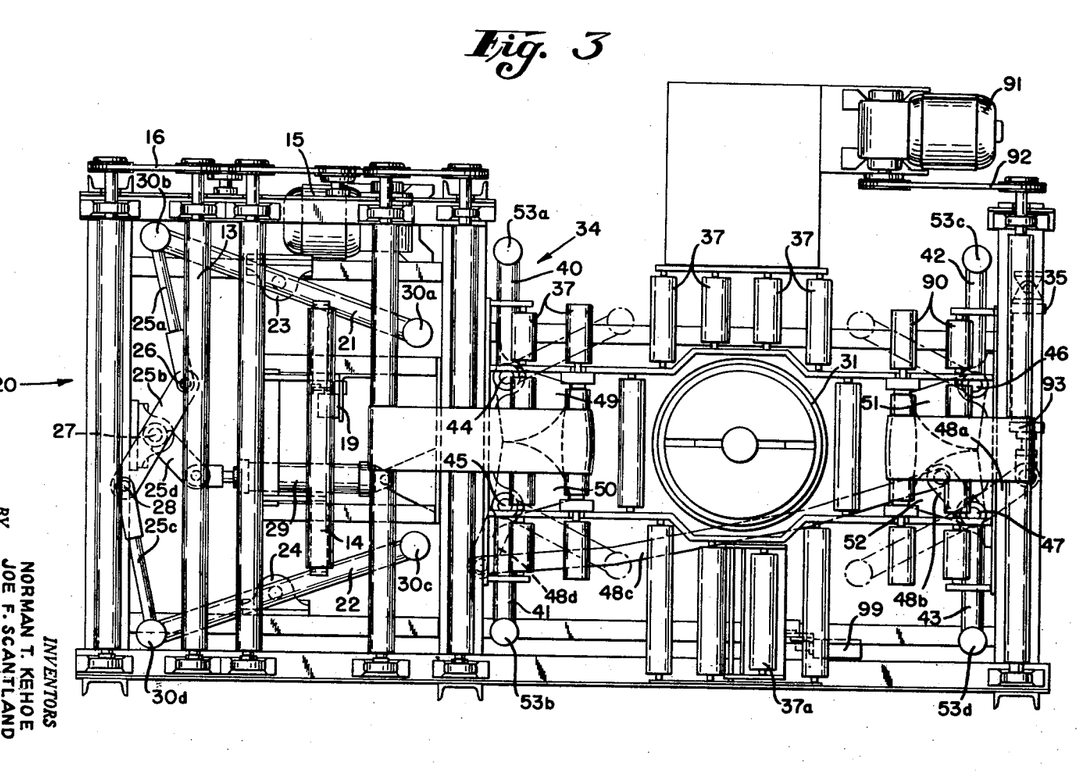
FIG. 3 is a plan view of the said apparatus, the view being taken along the line III—III in FIG. 1.

The mechanism 20 may be more readily described with reference to FIGS. 2 and 3 and comprises a pair of arms 21, 22 pivotally mounted at points 23, 24, respectively, and linked together by arms 25a, 25b and 25c having pivots at points 26, 27 and 28 and actuated by a pneumatic cylinder 29 through link arm 25d. The arms 21 and 22 have suitable rolls 30a, 30b, 30c, 30d at the ends thereof for engaging the tread of a conveyed tire. The mechanism 20 is represented in its position corresponding to the unactuated condition of cylinder 29.

Located adjacent the feeder mechanism is a mechanism 34 for automatically positioning and centering the tire over a lower bead-engaging rim 31. The mechanism 34 is actuated by a pneumatic cylinder 35 which is in turn controlled by means of a limit switch and a solenoid valve (not shown in FIGS. 1 or 3) as will be explained subsequently. A table of rolls 37, 37 is disposed to accept a tire from the conveyor rolls 13, 13. A belt drives a pair of rolls 37, 37 for conveying the tire.

The centering mechanism 34 comprises four arms 40, 41, 42, 43 pivotally mounted on pins 44, 45, 46, 47, respectively, attached to the supporting frame 18. Gears 49, 50, 51, 52 are attached to the arms 40, 41, 42, 43, respectively, for displacing the arms in response to actuation by cylinder 35 which is connected to arms 41 and 43 by means of links 48a, 48b, 48c, 48d. Suitable rollers 53a, 53b, 53c, 53d are mounted on arms 40, 41, 42, 43, respectively, for engagement with the tread of the tire. The centering mechanism is represented in solid-line construction in its condition corresponding to the unactuated condition of cylinder 35 and in broken-in-line construction in its condition corresponding to the actuated condition of cylinder 35.

The apparatus also includes a section of rolls 90, 90 for unloading tires after grinding. The rolls 90, 90 are driven by motor 91 through belts 92, 93.

Referring again to FIG. 1, the abrading apparatus comprises means for engaging one bead of a tire to support the tire. More particularly, this means comprises the hereinbefore referred to lower drum assembly or rim 31. The apparatus also includes means for engaging the other bead of the tire, which means comprises an upper drum assembly or rim 31a disposed above the lower rim 31. The apparatus also includes means for displacing one of the bead-engaging means, namely the lower rim 31, toward the other to enable the tire T to be gripped therebetween. More particularly, this means comprises a suitable shaft 32 actuated by a cylinder 33.

Figure 4:
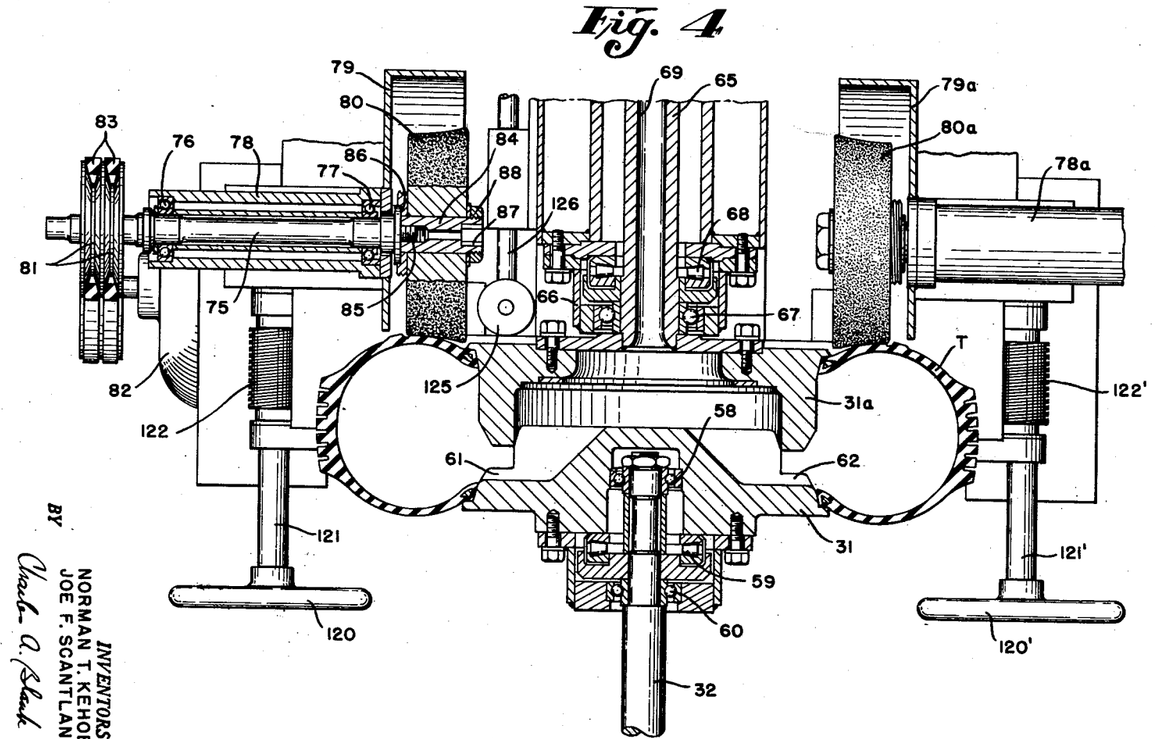
FIG. 4 is a sectional view taken along the line IV—IV in FIG. 2 and represents the apparatus when supporting an inflated tire.
Figure 5:
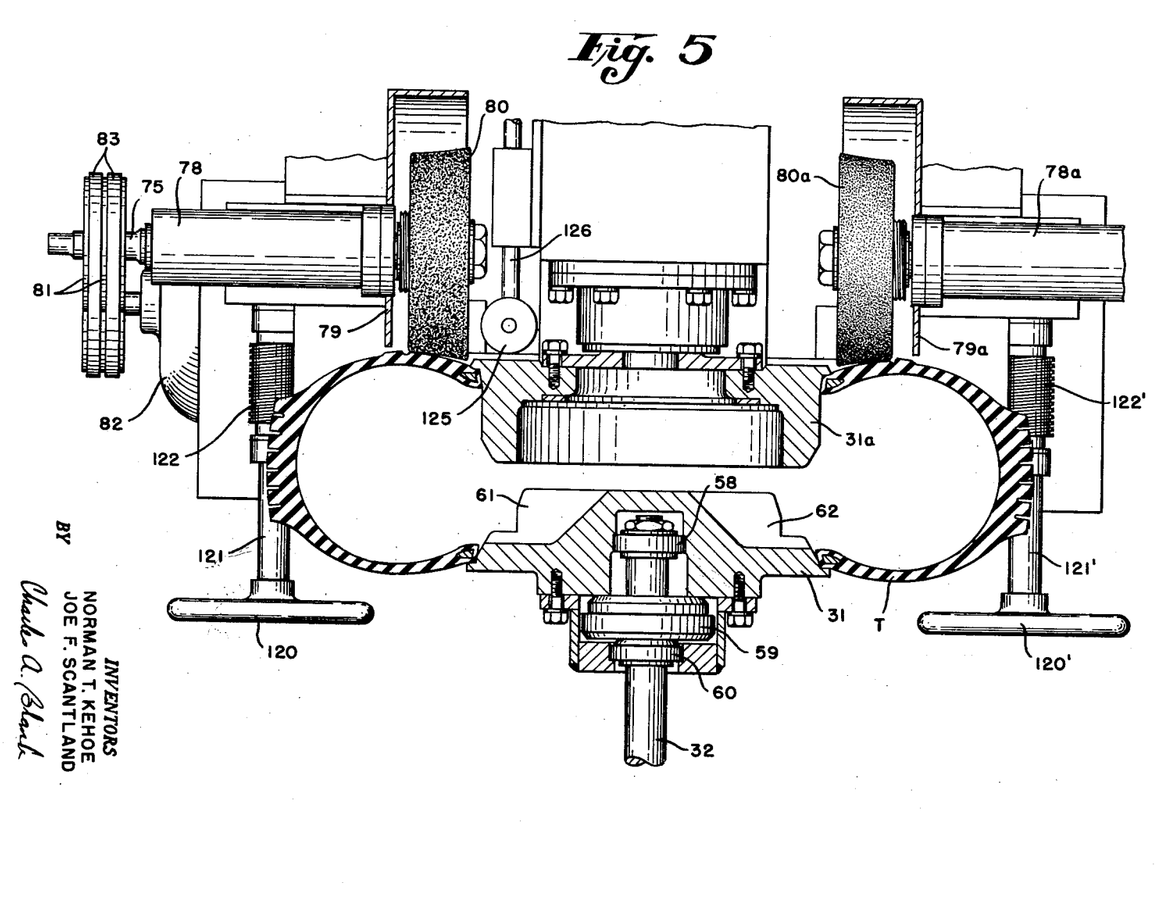
FIG. 5 is a sectional view of the apparatus similar to FIG. 4 and shows the apparatus supporting a tire of a larger size.

Referring now more particularly to FIGS. 4 and 5, the lower and upper rims 31, 31a of the drum assembly 11 are shown in a partially disengaged condition suitable for maintaining the tire T mounted thereon in a desired operative relation to the grinding wheels. The lower member 31 of the drum assembly is journaled on the shaft 32 of the cylinder 33 by means of bearings 58, 59 and 60 suitably mounted to provide full rotation of the bead-engaging rim 31 and its connecting parts. The bead-engaging rim 31 also has air passages 61 and 62 for inflating the tire T. The upper rim 31a is connected to a hollow shaft 65 rotatably mounted in a housing 66 on bearings 67, 68. The shaft 65 has an air passage 69 for inflating the tire T.

Referring for the moment to FIG. 1, to the upper end of the shaft 65 is keyed a pulley 72 which is driven by a motor 73 and belt 74. The upper extremity of the shaft 65 has a swivel connector 70 for air line 71.

Referring again to FIGS. 4 and 5, the grinding wheels or stones are similarly mounted on bracket plates 79, 79a. The rough grinding wheel 80 is mounted on the inner end of a shaft 75 suitably journaled in bearings 76 and 77 within a housing 78 which is attached to bracket plate 79. Mounted on the outer end of the shaft 75 are pulleys 81 which are driven by a motor 82 and belts 83. The wheel 80 is mounted on a separate arbor 84 having an internal threaded portion 85 for connection to the shaft 75. The arbor 84 has a recessed portion 86 which fits over the shaft 75 to serve as a pilot. The opposite end of arbor 84 is equipped with a hexagon recess 87 for tightening the arbor to the shaft 75 and an external thread and nut 88 for holding the wheel 80 on the arbor 84.

Figures 6, 7:
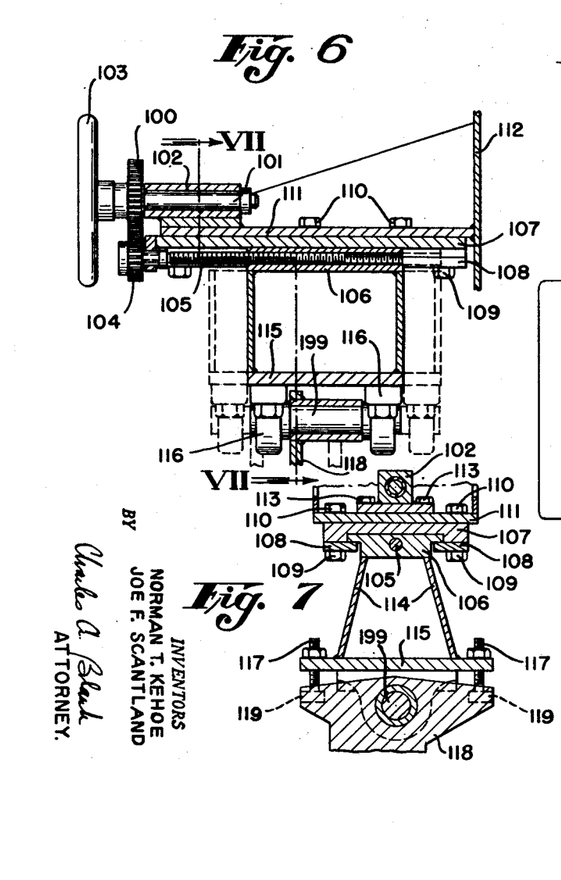
FIG. 6 is a sectional view, on an enlarged scale, taken along the line VI—VI in FIG. 2 and shows the means for adjusting the position of the rough grinding wheel.
FIG. 7 is a sectional view taken along the line VII—VII in FIG. 6.

Referring now to FIGS. 6 and 7, there is represented apparatus for manually adjusting the rough grinding wheel axially of itself and diametrically of the tire. A hand wheel 103 is provided to effect this adjustment and attached thereto is a gear 100 keyed to a shaft 101 contained in a housing 102. The gear 100 meshes with a gear 104 attached to a threaded shaft 105. The shaft 105 screws into a block 106, enabling the block to move, upon rotation of the shaft 105, within a plate 107 and side retaining plates 108 which are attached to the plate 107 by means of screws 109. The plate 107 is attached by means of screws 110 to an extension 111 of a side plate 112 of the apparatus. The housing 102 is also attached to the extension 111 by means of screws 113. Plates 114 are welded to and suspended from block 106 and are also welded to a base plate 115. Attached to the bottom of plate 115 are two pillow blocks 116 in which a shaft 199 is journaled. The shaft 199 carries a downwardly depending supporting structure 118 (see FIGS. 6 and 7) to which is connected one end of the bracket plate 79 (see FIG. 2). Thus, both the shaft 199 and the rough grinding wheel assembly 78—79—80 are enabled to move as a unit angularly about the axis of the shaft 199, i.e. about an axis parallel to the axis of the grinding wheel 80. In effect, the bracket plate 79 constitutes an elongated arm one end of which is suspended from the shaft 199 and the other end of which carries the grinding wheel. It will, therefore, be understood that by virtue of this arrangement the grinding wheel can also move substantially vertically relative to the tire T, the extent of such movement being predetermined by the adjustment of a pair of studs 117 mounted on the base plate 115 relative to a pair of abutments 119 (see FIG. 7) carried by the structure 118.

Referring again to FIGS. 1, 2, 4, and 5, a hand wheel 120 is provided to rotate shaft 121 and worm gear 122 which engages a gear segment 123 to position a shaft 124 in accordance with adjustment of the hand wheel 120. Rotation of the shaft 124, which is connected to the mounting structure 118, thus angularly displaces the mounting bracket 79 to provide an adjustment of the rough grinding wheel 80 substantially vertically relative to the tire.

Figures 10, 12:
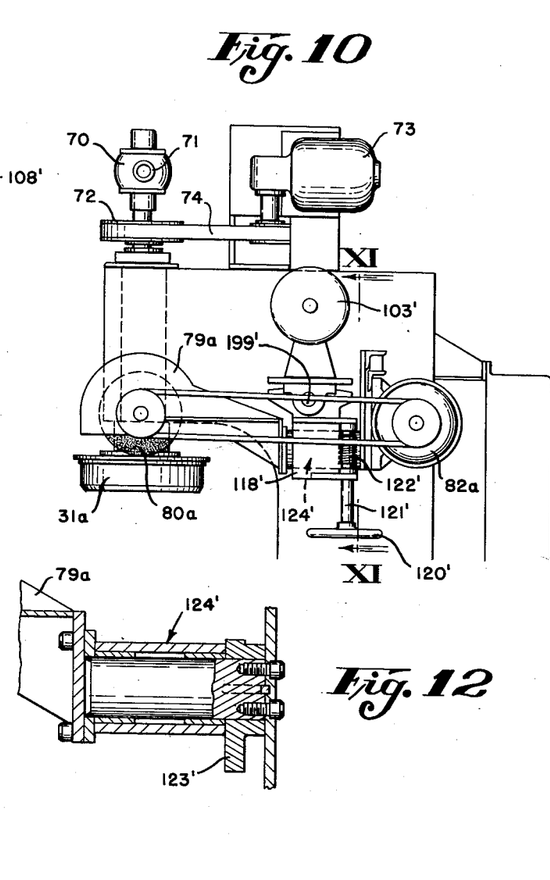
FIG. 10 is an elevational view of the finish grind side of the apparatus shown in FIG. 1.
FIG. 12 is a sectional view taken on line XII—XII of FIG. 11.
Figure 11:
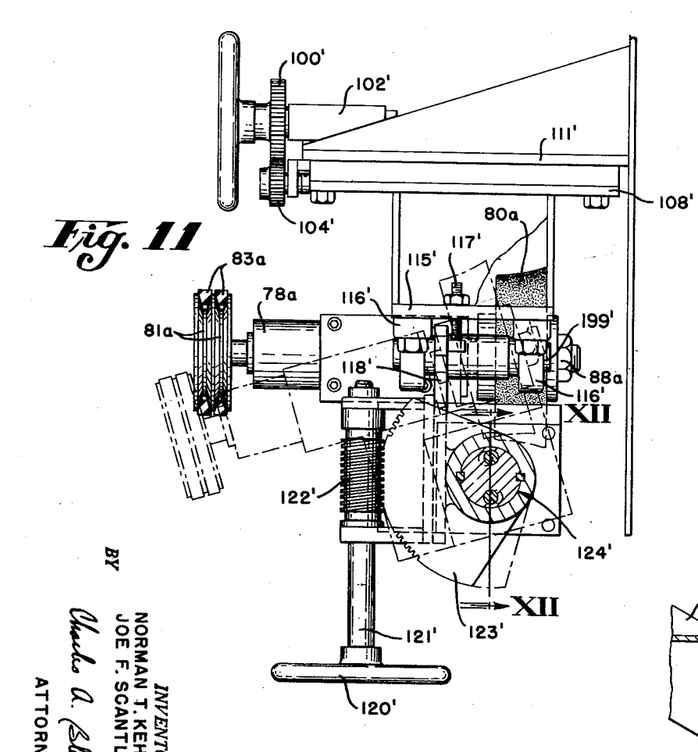
FIG. 11 is a sectional view taken on line XI—XI of FIG. 10.

The finish grinding wheel 80a is supported for adjustment and displacement relative to the tire T in the same manner as the rough grinding wheel 80. To this end, there are provided two hand wheels 103' (see FIG. 1) and 120' (see FIGS. 1, 4 and 5). The hand wheel 103' for the axial adjustment of the wheel 80a is connected with a mechanism which is identical in construction and arrangement with the mechanism shown in FIGS. 6 and 7, as represented in FIGS. 10, 11, and 12. It will, therefore, be understood that the bracket plate 79a which carries the finish grinding wheel 80a at one end is attached at its other end to a mounting structure 118' which corresponds to the structure 118 shown in FIGS. 6 and 7 and is in turn suspended from a rotatable shaft 199' corresponding to the shaft 199 and extending parallel to the axis of the finish grinding wheel 80a. At the same time, the hand wheel 120' is connected via its associated shaft 121', worm gear 122' and gear segment 123' to a shaft 124' which is connected to the aforesaid mounting structure 118' so that as represented in broken-line construction in FIG. 11, rotation of the shaft 124' effects an angular displacement of the grinding wheel 80a about the axis of the shaft 124'. As represented in FIG. 12, the mounting plate for motor 82a of FIG. 10 is bolted to shaft 124' which is attached to gear segment 123'. The bracket 79a and end mounting plates (also shown in FIG. 10) are attached to shaft 124' for rotation therewith. The foregoing adjustment is made initially to adjust the apparatus to process a given wide range of tire sizes. Thereafter, the grinding operation is accomplished automatically.

Both the rough grinding wheel 80 and the finish grinding wheel 80a are pivotally mounted on shafts 199 and 199', respectively. However, their freedom of movement is limited by studs and abutments such as 117 and 119 (FIG. 7) to, for example, a small vertical movement of approximately one inch. This compensates for variations in a given tire sidewall or variations between sidewalls of different tires. During grinding the wheels 80 and 80a are not rockable about axes transverse to the respective axes of rotation and are essentially fixed-position wheels. In the case of the finish grinding wheel, of course, if this were true in the known sidewalls abrading apparatus in which the position of the sidewall is fixed during the grinding operation, the region of contact between the wheel and the sidewall would never change, and portions of the sidewall would never be abraded at all. This potential drawback is avoided by the present invention by means of a change in the orientation of the sidewall relative to the grinding wheel surface during the abrading or finish grinding operation. The said change in sidewall orientation is achieved by a gradual lowering of the lower bead-engaging rim 31 during the finish grinding part of the overall abrasion cycle. The pivotal mounting of the grinding wheel on shaft 199′ allowing slight vertical movement of the grinding wheel 80a ensures that all parts of the sidewall are successively contacted and abraded. The manner in which this occurs will be more fully explained hereinafter.

Figure 13:
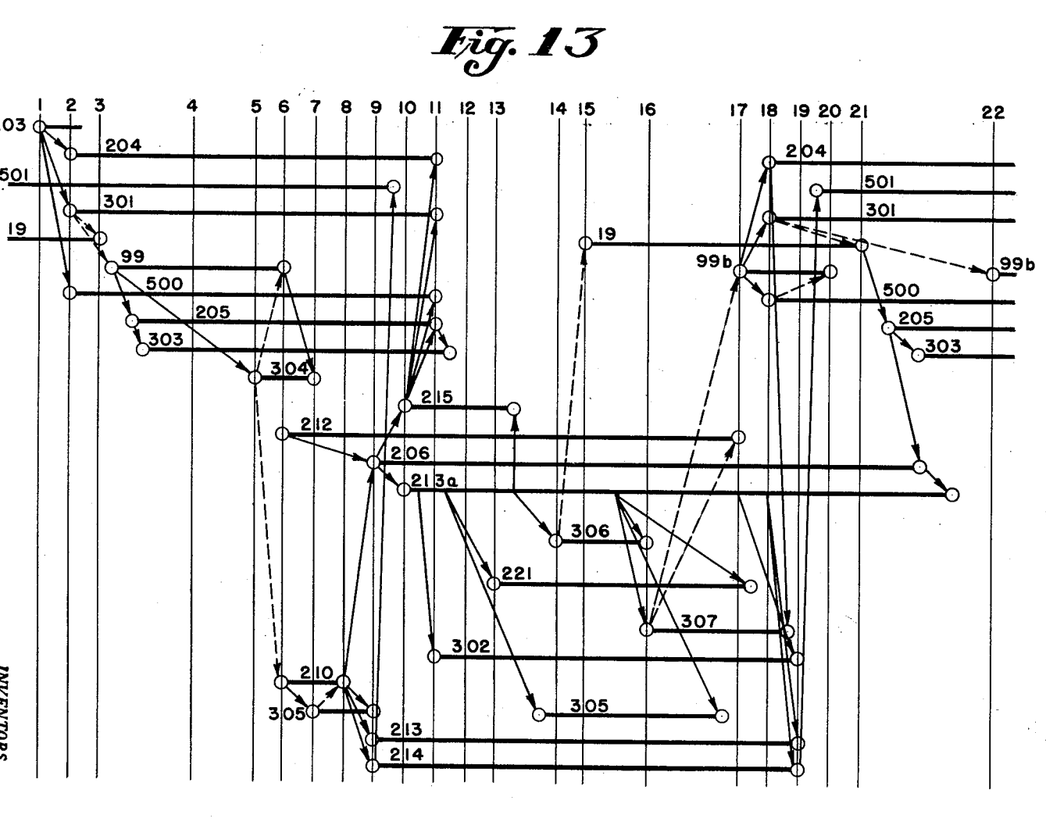
FIG. 13 is a sequence diagram to aid in explaining the operation of the apparatus of the present invention.

Considering now the operation of the apparatus, reference will be made initially to the sequence diagram of FIG. 13 representing the operation of the apparatus, to the diagram of the pneumatic system of the apparatus shown in FIG. 14, and the diagram of the electrical control system shown in FIG. 15. Various relays of FIG. 15 and their corresponding contacts are related in the diagram by corresponding reference numerals and by broken lines between the relay windings and the contacts. The limit switches and relay contacts of FIG. 15 are represented in their unactuated condition.

Figure 14:
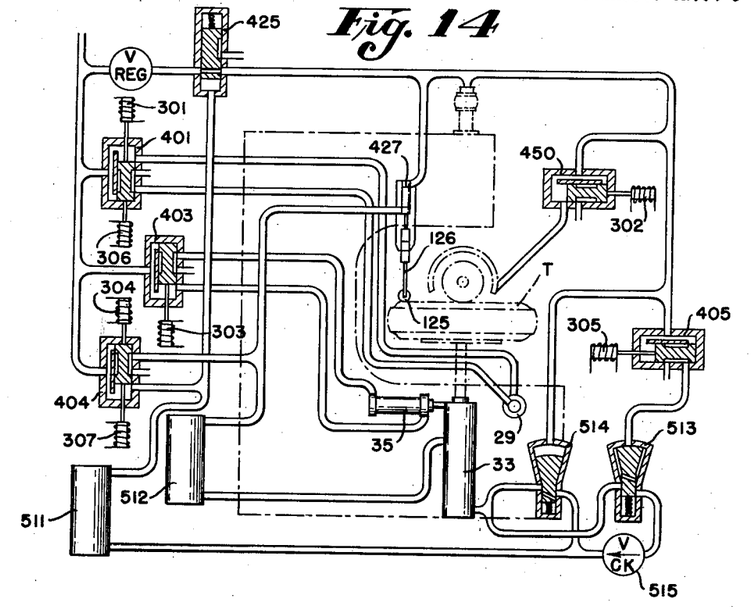
FIG. 14 is a diagram of the pneumatic system for controlling the operations of the apparatus.
Figure 15:
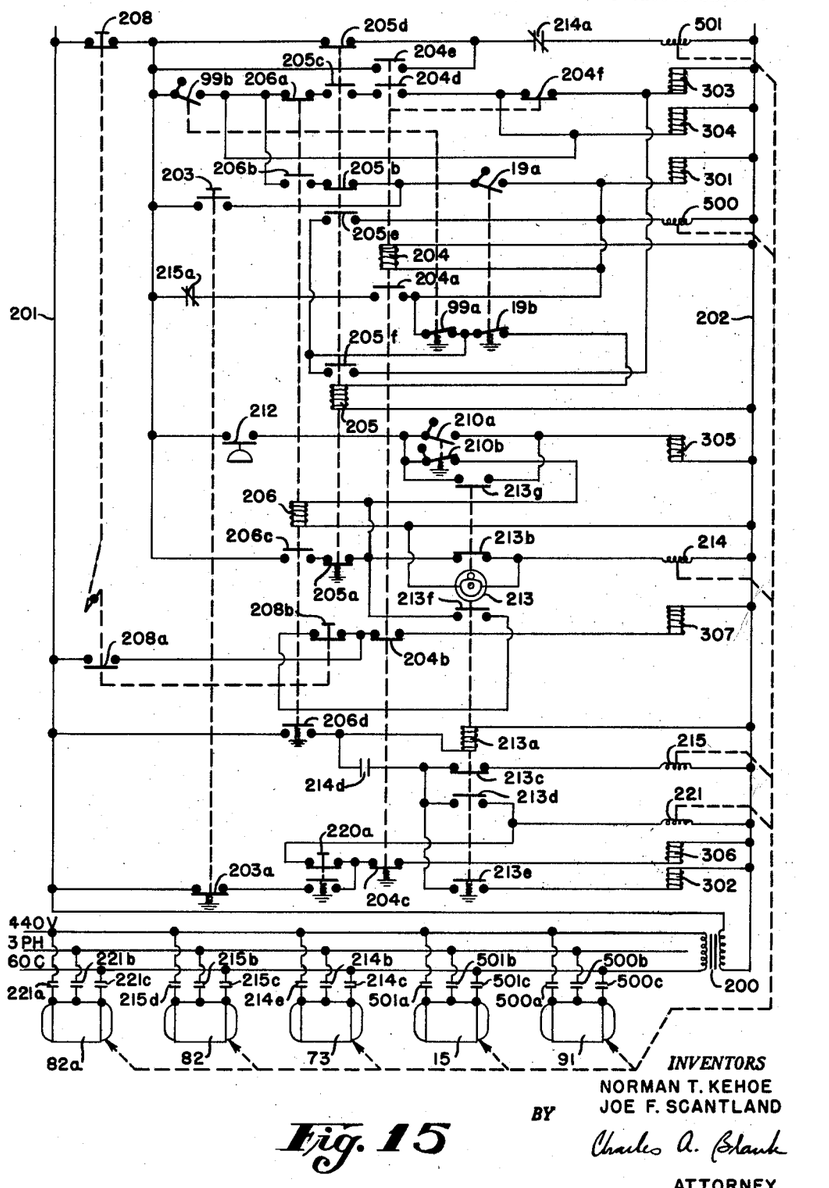
FIG. 15 is a partly schematic circuit diagram of the electrical control system for the apparatus.

As illustrated in FIG. 15, suitable alternating-current power is supplied through a transformer 200 to lines 201 and 202. When start button 203 is depressed, relay 204 is energized through limit switch contacts 19a which are closed due to the presence of a tire in the feed gate mechanism. When relay 204 is energized, contacts 204a, 204d and 204e close and contacts 204b and 204c open. When the start button 203 is depressed, contacts 203a perform an interlocking function to prevent simultaneous energization of solenoids 301 and 306 in the event that button 220a should also be depressed at this time in the cycle. Also at this time motor control relay 500 is energized, closing contacts 500a, 500b, 500c. The unloading motor 91 then is energized to operate conveyor rolls 93, to unload the previous tire from the apparatus to a suitable conveyor (not shown). At the same time solenoid 301 is energized to shift valve 401 from the position represented in FIG. 14 to its alternative position, thereby actuating cylinder 29 and opening the gate arms 21 and 22 to allow the tire to pass from the feeder conveyor rolls 13 to the table rolls 37.

The feeder conveyor rolls 13 are driven by motor 15 when relay 501 is energized. When the tire moves off the feeder conveyor rolls 13, limit switch 19 assumes its unactuated condition, opening contacts 19a and closing contacts 19b. When limit switch contacts 19b close, relay 205 is energized through limit switch contacts 19b, limit switch contacts 99a, relay contacts 204a and 215a, and stop button 208. When relay 205 is energized, relay contacts 205a, 205b, and 205d open, and 205c, 205e, and 205f close. Solenoid 303 of the valve 403 is energized through closed contacts 205e, 205f, 204a and 215a. When solenoid 303 is energized, valve 403 shifts from the position represented in FIG. 14 to its alternate position, actuating cylinder 35 to close the centering rolls 53a, 53b, 53c, 53d on the tire. When the tire is transferred to the table rolls 37 and is positioned between the centering rolls, roll 37a actuates limit switch 99, opening the limit switch contacts 99a and closing contacts 99b. Contacts 205e serve as holding contacts to maintain relay 205 energized.

Limit switch contacts 99b, when closed, are effective to cause energization of solenoid 304 through contacts 204d, 205c, 206a, and stop button 208. Valve 404 then shifts to the position represented in FIG. 14 to actuate cylinder 33 and raise the lower rim 31 to engage the tire. This is accomplished by admitting air to the top of oil tank 511 and releasing air from the top of oil tank 512 and cylinder 427. Valve 513 is closed and valve 514 is open, thereby admitting oil to the bottom of cylinder 33 to actuate the cylinder.

While the tire is rising to the position represented in FIG. 14, limit switch 99 is released and contacts 99a close again while contacts 99b open. When contacts 99b open, solenoid 304 is deenergized. When the tire reaches its maximum limit represented in FIG. 14, the tire is inflated by means of air pressure through a pressure-reducing valve 425, connector 70 and shaft 65. The valve 425 is controlled through valve 404. Air pressure in the tire causes contacts of pressure switch 212 to close, indicating that the tire pressure has reached the prescribed limit for proper grinding. Also, air pressure through valve 425 pressurizes the diaphragm of valve 514 causing it to close, thereby blocking the oil pressure in cylinder 33. Simultaneously with the inflation of the tire, cylinder 427 is actuated at its upper end. As the wheel 125 on the shaft 126 of cylinder 427 is raised by the tire to the position represented in broken-line in FIG. 8, a limit switch 210 (see FIG. 2) is actuated to energize solenoid 305 through contacts 210a and stop button 208. When solenoid 305 is energized, valve 405 shifts to its alternate position from the position represented in the drawing, applying air pressure to valve 513 to open valve 513, thereby bleeding oil from the bottom of cylinder 33 through an adjustable control valve. This reverse operation of the cylinder 33, which is symbolized by the short horizontal line labeled 305 and extending across vertical lines 7 to 9 in the sequence diagram of FIG. 13 near the bottom thereof, separates the rims at a controlled speed and lowers the upper sidewall of the tire in a relatively short period of time until the limit switch 210, actuated by the shaft of cylinder 427, is released. The release of the limit switch 210 opens contacts 210a and deenergizes solenoid 305, shifting valve 405 to the position represented in FIG. 14 and closing valve 513 which locks the cylinder 33 in position to hold the rims properly separated for the rough grinding operation.

Figure 8:
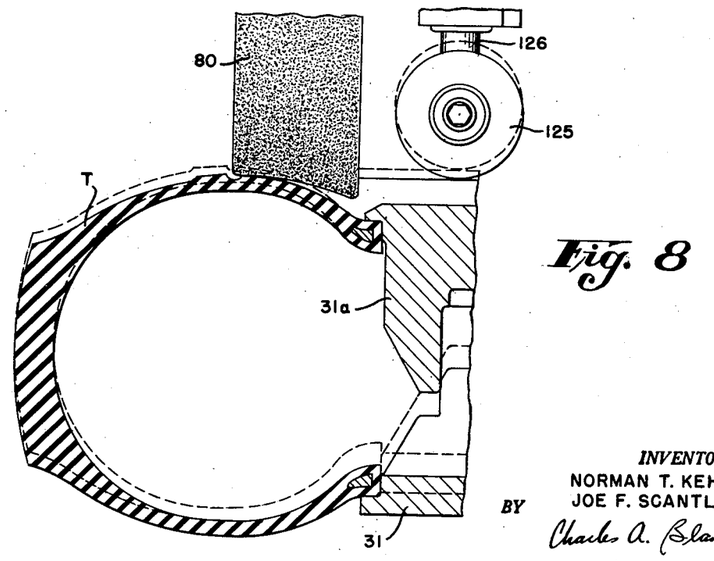
FIG. 8 is an enlarged fragmentary view of a detail of the apparatus shown in FIG. 4.

Referring for the moment to FIG. 8, the broken-line construction represents the rims closed with the tire T in its position of maximum height. The solid line construction of FIG. 8 shows the separated rims, the upper sidewall in its position of final adjustment and the contour regulator wheel 125 engaging the rib on the sidewall. In this manner, a predetermined vertical dimension is maintained between the rib and the tire bead held by the upper rim 31a. This vertical dimension controls the relation between the sidewall and the surface of the rough grinding wheel 80 so that the white portion of the sidewall at the white-black juncture substantially conforms to the contour of the grinding wheel.

When the limit switch 210 is released due to the reverse operation of cylinder 33, relay contacts 210b close, energizing relay 206 through contacts 212, 210b, and stop button 208. Relay contacts 206a then open and relay contacts 206b, 206c and 206d close.

The program timer for the machine is a commercially available Eagle Multiflex Timer having a motor 213 and a clutch actuated by energizing a solenoid 213a to engage a set of drive gears located on a column. The column is driven by the motor 213 when the gears are engaged to actuate a cam surface which opens and closes contacts 213b–213g inclusive. When limit switch 210 is released, timer motor 213 is started and relay 214 is energized to rotate the tire, due to current flow through contacts 213b, 210b, 212 and stop button 208. When relay 214 is energized, relay contacts 214a open, deenergizing relay 501 and temporarily stopping the loading conveyor motor 15 by opening contacts 501a, 501b, 501c.

When relay contacts 206d close, timer clutch solenoid 213a is energized, engaging the timer gears during the mechanical action initiated by the starting of motor 213. Simultaneously with the closing of contacts 206d, through 214d and 213c, rough grind relay 215 is energized, thereby closing contacts 215b, 215c and 215d to start motor 82.

When relay 215 is energized, relay contacts 215a open, deenergizing relays 204 and 205 and solenoids 301 and 303. When solenoid 301 is deenergized, solenoid 306 is effective to shift the valve 401 to the position represented in FIG. 14, releasing air from cylinder 29 and thereby returning the feeder arms 21, 22 to the position represented in FIG. 2. The next tire then passes into the feed portion of the apparatus.

The control relay 500 for the unloading drive motor 91 and relay 205 are also deenergized when relay contacts 204a open. Solenoid 303 is deenergized when relay contacts 204d open and solenoid valve 403 then returns to the position represented in FIG. 14, opening the centering mechanism 40, 41, 42, 43 shown in FIG. 3.

When contacts 213e close, solenoid 302 is energized, actuating its corresponding valve 450 to direct air jets at the two grinding stones to clean and cool the tire. At the end of a predetermined time delay determined by the cam surface of the timer, relay contacts 213c open, deenergizing relay 215 and causing the rough grind motor to stop. At the same time contacts 213d close and solenoid 306 is energized through relay contacts 204c, contacts 220a, contacts 213d, 214d and 206d. When solenoid 306 is energized, valve 401 shifts to the position represented in the drawing, thereby releasing pressure from cylinder 29 and returning the feed gate arms 21 and 22 to the position represented in FIG. 3. When the gate arms 21, 22 return to the position represented in FIG. 3, the next tire enters the feed portion of the apparatus and actuates limit switch 19. Also, control relay 221 is then energized through contacts 213d, 214d and 206d, closing contacts 221a, 221b, 221c to start the finish grind motor 82a.

At the so-initiated finish grinding part of the overall abrading cycle, the timer 213 closes contacts 213g which completes a circuit around the then open contacts 210a to the solenoid 305 to reenergize the same. This reverses valve 405 to pressurize valve 513, which permits the hydraulic fluid from the bottom of cylinder 33 to pass through the valve 513 at a relatively slow rate controlled by a check valve 515. As a consequence, the lower chuck or bead-engaging rim 31 descends slowly away from the upper rim 31a. This condition is represented in the sequence diagram of FIG. 13 by the horizontal line labeled 305 near the bottom of the diagram and extending across vertical lines 14 to 16.

The significance of this gradual spreading of the bead-engaging rims from the standpoint of the mechanical operations on the tire will best be understood by referring to FIGS. 4 and 9. When the rough grinding operation, which, it will be recalled, is carried out at a predetermined spacing of the rims 31 and 31a, is terminated, the finish grinding wheel 80a is in a position (reached by axial adjustment thereof through the intermediary of hand wheel 103') in which its outside edge (the right-hand edge in FIG. 4) is in alignment with the center of the groove formed in the tire sidewall just inside the rib. Since the sidewall at this time has a certain downward slant radially inwardly of the tire, only the portion thereof adjacent the said groove is contacted by the finish grinding wheel, and it is this portion which is first abraded when the motor 82a is started. Thereafter, as the lower rim 31 descends (upon reenergization of solenoid 305 as previously described) to increase the separation of the beads, the orientation or contour of the upper sidewall is changed from that shown in FIG. 4 to that shown in FIG. 9 due to the fact that the entire body of the tire except for the upper bead is shifted and drawn downwardly by the lower rim 31. While this change in sidewall contour is taking place, the wheel 80a remains in contact with the surface of the sidewall by virtue of its being pivotally mounted on the shaft 199' of FIG. 11. With reference to FIGS. 4 and 9, this means that the finish grinding wheel 80a is shifted in a direction perpendicular to the plane of the tire section represented in the drawings, and since this movement is about the axis of the said pivot shaft, the wheel moves along a short downward arc and thus is able to stay in contact with the sidewall despite the lowering of the latter. However, it will be readily understood from FIGS. 4 and 9 that as the sidewall is lowered and the wheel in effect follows it down, the region of contact of the grinding wheel with the tire sidewall is gradually changed and displaced from the sidewall groove toward the opposite edge of the sidewall which lies adjacent the upper bead of the tire. In this manner, the entire expanse of the sidewall is subjected to the desired finish grinding operation without the necessity of having the grinding wheel move radially of the tire, i.e. axially of itself and angularly about an axis transverse to its axis of rotation, along the fixed contour of the sidewall.

Returning now to FIGS. 13 to 15, contacts 213d of the timer deenergize relay 221 and solenoid 306 after a preset time interval determined by the cam surface of the timer. Solenoid 307 is then energized, shifting valve 404 from the position represented in FIG. 14 to its alternate position and allowing the tire to be deflated and lowered. Tire deflation occurs when valve 404 exhausts the air from the lines connected to oil tank 511. Also, air is then exhausted from valve 425, which shifts from the position represented in the drawing to its alternate position. Air is then exhausted from valve 514, which shifts from the position represented in the drawing to its alternate position, deflating the tire and allowing oil to flow from the bottom of cylinder 33. At the same time air pressure is applied through valve 404 to oil tank 512, causing the application of hydraulic pressure to the top of cylinder 33 to lower the tire. When the tire has been completely lowered, it engages roller 37a actuating limit switch 99.

When this limit switch 99 is actuated, contacts 99a open and contacts 99b close. Relay 204 and solenoid 301 are then energized by current flow through contacts 19a, 205b, 206b, 99b and stop button 208. The energizing of relay 204 closes contacts 204a, 204d and 204e and opens contacts 204b and 204c. The opening of contacts 204b deenergizes solenoid 307. At the same time, solenoid 301 is energized to shift valve 401 from the position represented in FIG. 14 to its alternate position, thereby actuating cylinder 29 and opening the gate arms 21 and 22. Also, the closing of contacts 99b results in energization of relay 500 through contacts 19a, 205b, 206b, 99b and stop button 208. When relay 500 is energized, the unloading motor 91 operates conveyor rolls 93, preparing to unload the tire from the apparatus to a suitable conveyor (not shown), thereby releasing limit switch 99. At a suitable time, the timer causes relays 213 and 214 to be deenergized by opening normally closed contacts 213b, thereby stopping the timer motor and the tire rotating motor 73.

When relay 214 is deenergized, relay 501 is energized by current flow through relay contacts 214a, 205d and stop button 208. The feed motor 15 then operates to cause the next tire to pass from the feed conveyor rolls 13 to the table rolls 37.

When the tire moves off the feed conveyor rolls 13, limit switch 19 assumes its unactuated condition, opening contacts 19a and closing contacts 19b resulting in the energization of relay 205 as previously described. The energizing of relay 205 opens contact 205a, deenergizing relay 206. When relay 206 is deenergized, contacts 206b, 206c and 206d open and contacts 206a close. Contacts 206a allow solenoid 304 to be energized for raising the tire. Contacts 206c open the maintaining circuit to relay 206. Contacts 206d deenergize timer clutch solenoid 213a. Deenergizing solenoid 213a causes the cam surface which actuates all timer contacts to be automatically reset to its start position corresponding to time zero. Also, when the tire is transferred to the table rolls 37 and is positioned between the centering rolls, limit switch 99 is actuated as previously described.

The operation of the apparatus is then the same as previously described continuing from the fourth step (vertical line 4) of the sequence diagram of FIG. 13.

In the event that it is desired to stop the operation of the machine immediately, stop button 208 may be depressed, opening contacts 208a and 208b. Solenoid 307 will then be energized, actuating valve 404 and allowing the tire to be lowered.

From the foregoing description it will be understood that the present invention contemplates the provision of a tire sidewall abrading process and apparatus wherein, during at least a part of the grinding operation, the orientation or contour of the sidewall relative to the axis of the tire and thus relative to the active surface of the grinding or abrading means is changed to permit the latter to contact and abrade all sections of the sidewall. In a somewhat more specific sense, the invention contemplates a tire sidewall abrading procedure wherein the tire beads are gripped between a pair of opposed bead-engaging means and a preferably slow and gradual increase of the spacing between the said bead-engaging means is provided at the same time that the sidewall is subjected to an abrading operation, preferably a finish grinding operation. As herein disclosed, although it is to be understood that the invention is not so limited, the aforesaid increase of the spacing between the bead-engaging means is best achieved by lowering the lower one of a pair of vertically spaced bead-engaging rims at a controlled rate determined by a suitably operated, check valve-equipped pressure fluid system.

It is apparent that the finish grinding wheel may operate during the entire period of operation of the rough grinding wheel and continue to operate after the termination of the rough grinding operation to provide sequential rough and finish grinding operations. Also, if desired, the rough and finish grinding wheels may be substantially the same and provide substantially the same degree of abrasion of the sidewall with the difference between first and second grinding operations residing in changing the orientation of the sidewall during one of the operations. The invention also has obvious application in a one-stage grinding operation, for example, a finish grinding operation.

Moreover, the many advantages of the sidewall abrading process and apparatus according to the present invention will be readily apparent. Principally, however, it will be appreciated that this process and apparatus are highly suited to treating tires in a wide range of sizes at high speed as well as with a minimum of supervisory attention and thus at a minimum of labor costs. This is due to the fact that the tires are automatically positioned and adjusted for the initial rough grinding, and that thereafter the sidewall contours are automatically adjusted during the finish grinding without any necessity for a rockable finish grinding wheel and the rocking mechanism therefor, the elimination of which materially simplifies both the process and the apparatus.

While there has been described herein a preferred embodiment of this invention, it will be obvious to those skilled in the art that various changes and modifications may be made therein without departing from the invention, and its is, therefore, aimed to cover all such changes and modifications as fall within the true spirit and scope of the invention as defined by the appended claims.

Having thus described our invention, what we claim and desire to secure by Letters Patent is:

1. In the process of precisely abrading the sidwall of a tire having beads, wherein the beads of the tire are gripped; the improvement comprising the step of abrading the sidewall and the step of adjusting the relative position of at least one of the beads with respect to the other bead to change the orientation of said sidewall while said sidewall is being subjected to abrasion.

2. In the process of precisely abrading the sidewall of a tire having beads, wherein the beads of the tire are gripped during rough and finish abrasion; the improvement comprising the step of abrading the sidewall and the step of adjusting the relative position of at least one of the beads with respect to the other bead to change the orientation of said sidewall while said sidewall is being subjected to finish abrasion.

3. In the process of precisely abrading the sidewall of a tire having beads, wherein the beads of the tire are gripped during first and second abrasions; the improvement comprising the steps of maintaining the beads in fixed relative positions to maintain the orientation of said sidewall fixed while said sidewall is being subjected to the first abrasion, and adjusting the relative position of at least one of the beads with respect to the other bead to change the orientation of said sidewall while said sidewall is being subjected to the second abrasion.

4. In the process of precisely abrading the sidewall of a tire having beads, wherein the beads of the tire are gripped during abrasion of the sidewall; the improvement comprising the step of abrading the sidewall and the step of gradually and slowly increasing the spacing between the beads while said sidewall is subjected to the abrasion.

5. In the process of precisely abrading the sidewall of a tire having beads, wherein the beads of the tire are gripped during sequential rough and finish abrasions of the sidewall; the improvement comprising the step of roughly abrading the sidewall, the step of sequentially finish abrading the sidewall and the step of gradually and slowly increasing the spacing between the beads while said sidewall is subjected to the finish abrasion.

6. The process of precisely abrading the sidewalls of tires having beads, comprising the steps of gripping the beads of a tire, inflating said tire and rotating the same while so gripped, subjecting the sidewall to be abraded to a rough grinding operation at a fixed spacing of the beads, and subjecting said sidewall to a finish grinding operation while gradually and slowly increasing the spacing between the beads.

7. The process of precisely abrading the sidewalls of tires having beads, comprising the steps of feeding a tire to a grinding location, gripping the beads of said tire at said grinding location, inflating said tire and rotating the same while so gripped, subjecting the sidewall to be abraded to a rough grinding operation for a first predetermined time interval and at a fixed spacing of said beads, thereafter subjecting said sidewall to a finish grinding operation for a second predetermined time interval while gradually and slowly increasing the spacing between said beads, deflating said tire upon termination of said finish grinding operation, releasing the beads, and discharging said tire from said grinding location.

8. Apparatus for precisely abrading the sidewalls of tires comprising: grinding means; a pair of bead-engaging means for gripping and supporting a tire so as to present the sidewall to be abraded to said grinding means; and means for adjusting the relative position of at least one of said pair of bead-engaging means with respect to the other thereof to change the orientation of said sidewall relative to the active surface of said girnding means while said sidewall is being subjected to the action of said grinding means.

9. Apparatus for precisely abrading the sidewalls of tires comprising: sequentially operated rough grinding means and finish grinding means; a pair of opposed bead-engaging means for gripping and supporting a tire so as to present the sidewall thereof to be abraded to both said grinding means; and means for adjusting the relative position of at least one of said pair of bead-engaging means with respect to the other thereof to change the orientation of said sidewall relative to the active surface of said finish grinding means while said sidewall is being subjected to the action of said finish grinding means.

10. Apparatus for precisely abrading the sidewalls of tires comprising: sequentially operated rough grinding means and finish grinding means; a pair of opposed bead-engaging means for gripping and supporting a tire so as to present the sidewall thereof to be abraded to both said grinding means; means for initially adjusting and fixing the orientation of said sidewall relative to the active surface of said rough grinding means for the duration of the operation of said rough grinding means, and means for adjusting the relative position of at least one of said pair of bead-engaging means with respect to the other thereof to change the orientation of said sidewall relative to the active surface of said finish grinding means while said sidewall is being subjected to the action of said finish grinding means.

11. Apparatus for precisely abrading the sidewalls of tires comprising: grinding means; a pair of opposed bead-engaging means arranged for relative approaching and separating movement and operable for gripping and supporting a tire so as to present the sidewall thereof to be abraded to said grinding means; and means operatively connected with said bead-engaging means for gradually and slowly increasing the spacing between said pair of bead-engaging means while said sidewall is being subjected to the action of said grinding means.

12. Apparatus for precisely abrading the sidewalls of tires comprising: sequentially operated rough grinding means and finish grinding means; a pair of opposed bead-engaging means arranged for relative approaching and separating movement and operable for gripping and supporting a tire so as to present the sidewall thereof to be abraded to both said grinding means; means operatively connected with said bead-engaging means for initially adjusting and fixing the spacing between said pair of bead-engaging means for the duration of the operation of said rough grinding means, and means operatively connected with said bead-engaging means for gradually and slowly increasing the spacing between said pair of bead-engaging means while said sidewall is being subjected to the action of said finish grinding means.

13. Apparatus for precisely abrading the sidewalls of tires, comprising rough grinding means, finish grinding means, means for sequentially operating said rough and finish grinding means, a pair of opposed bead-engaging means arranged rotatably as well as for relative approaching and separating movement and operable to grip and support a tire so as to present the sidewall thereof to be abraded to said grinding means, means communicating with the space between said bead-engaging means for inflating said tire when the latter is gripped by said bead-engaging means, means operatively connected with said bead-engaging means for rotating the same together with said tire when the latter is gripped thereby, means operable to effect positioning of said bead-engaging means at a predetermined constant spacing when said sidewall is being subjected to the action of said rough grinding means, and means operable to effect a slow and gradual increasing of the spacing between said bead-engaging means when said sidewall is being subjected to the action of said finish grinding means.

14. Apparatus for precisely abrading the sidewalls of tires, comprising rough grinding means, finish grinding means, means operable for sequentially actuating said rough and finish grinding means, a pair of opposed bead-engaging means arranged for rotation about a common axis and operable to grip and support a tire so as to present the sidewall thereof to be abraded to said grinding means, one of said bead-engaging means being axially movable toward and away from the other of said bead-engaging means, means operatively connected with said one bead-engaging means for axially moving the same, means communicating with the space between said bead-engaging means for inflating said tire when the latter is gripped and supported by said bead-engaging means, means operatively connected with said other bead-engaging means for rotating the same and therewith said tire and said one bead-engaging means when said tire is gripped by both said bead-engaging means, means operatively connected with said moving means so as to effect positioning of said one bead-engaging means for a first predetermined time interval at a predetermined constant spacing from said other bead-engaging means during actuation of said rough grinding means, means operatively connected with said moving means so as to effect a slow and gradual increasing of the spacing of said one bead-engaging means from said other bead-engaging means for a second predetermined time interval upon deactuation of said rough grinding means and during actuation of said finish grinding means, and means responsive to the termination of the finish grinding operation for effecting deactuation of said inflating means so as to deflate said tire and for effecting actuation of said moving means so as to retract said one bead-engaging means from said other bead-engaging means to disengage the beads from the same.

15. Apparatus for precisely abrading the sidewalls of tires, comprising a lower rim for engaging one bead of a tire so as to support the same, means for conveying a tire to said lower bead-engaging rim, means actuated by said tire while moving along said conveying means for automatically positioning said tire over said lower bead-engaging rim, an upper rim disposed above said lower rim for engaging the other bead of said tire, means actuated by the positioned tire for raising said lower bead-engaging rim with said tire toward said upper bead-engaging rim until the latter contacts said other bead and said tire is gripped between said rims, means for inflating the tire while so gripped, means for rotating said bead-engaging rims and said tire therewith, means for precisely abrading one sidewall of said tire, and means operable to reverse the operation of said raising means and to lower said lower bead-engaging rim gradually and slowly while said abrading means is in operation.

16. Apparatus for precisely abrading the sidewalls of tires, comprising a pair of bead-engaging means for supporting a tire, at least one of said bead-engaging means being adjustable with respect to the other sequentially operable rough grinding means and finish grinding means for abrading the sidewall of said tire, means for positioning said supporting means, means for inflating said tire, means contiguous with said sidewall when said tire is inflated for controlling said positioning means to maintain said supporting means stationary and provide a desired operative relation between said sidewall and said rough grinding means during operation of the latter, and means for adjusting the spacing of said pair of bead-engaging means during operation of said finish grinding means to slowly and gradually vary the orientation of said sidewall relative to said finish grinding means.

References Cited in the file of this patent
UNITED STATES PATENTS

| | | |
|---|---|---|
| 1,341,500 | Durham | May 25, 1920 |
| 1,848,684 | Woock | Mar. 8, 1932 |
| 2,136,036 | Avery | Nov. 8, 1938 |
| 2,269,556 | St. Clair | Jan. 13, 1942 |
| 2,392,667 | Hawkinson | Jan. 8, 1946 |
| 2,462,947 | Coleman | Mar. 1, 1949 |
| 2,810,238 | Yoho et al. | Oct. 22, 1957 |
| 2,986,849 | Clark | June 6, 1961 |